June 19, 1923.
J. C. OLSEN
1,459,514
ATTACHMENT FOR LATHES
Filed July 7, 1922
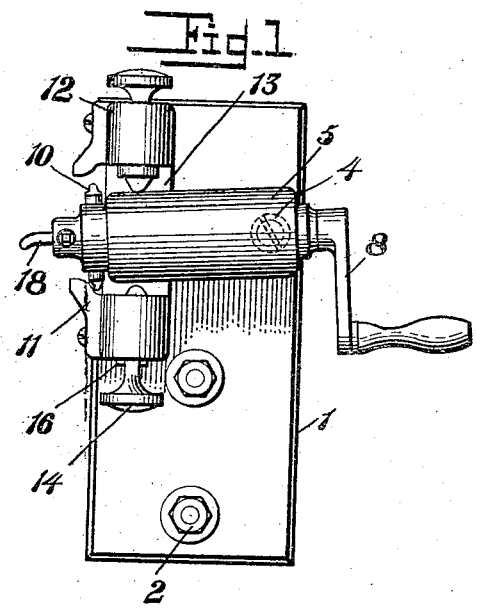
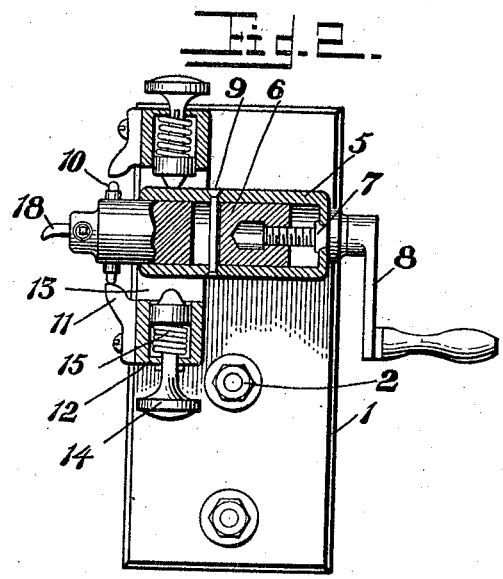
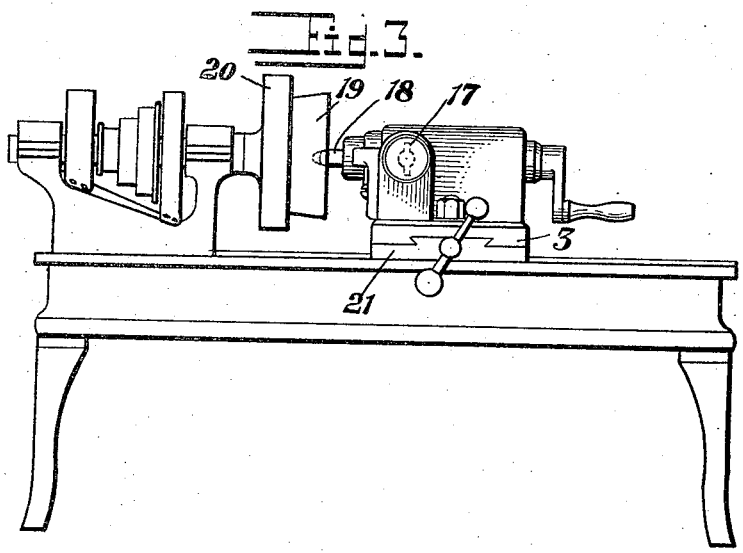
Inventor
J. C. Olsen
By W. N. Roach,
Atty Patented June 19, 1923.

1,459,514

UNITED STATES PATENT OFFICE.

JOHN C. OLSEN, OF ROCK ISLAND, ILLINOIS.

ATTACHMENT FOR LATHES.

Application filed July 7, 1922. Serial No. 573,488.

(FILED UNDER THE ACT OF MARCH 3, 1883, 22 STAT. L., 625.)

*To all whom it may concern:*

Be it known that I, JOHN C. OLSEN, a citizen of the United States, and a resident of Rock Island, county of Rock Island, and State of Illinois, have invented an Improvement in Attachments for Lathes, of which the following is a specification.

The invention described herein may be used by the Government, or any of its officers or employees in prosecution of work for the Government, or by any other person in the United States, without payment to me of any royalty thereon.

The subject of this invention is an attachment for lathes designed, primarily for turning the inside radius in the channel or silver rings used in the packing of gun brakes.

It has heretofore been customary to form silver packing rings by hand, scraping the channel of the ring to bring the inside radius to a standard gauge.

The present invention was devised to permit this work to be done by machinery, thereby performing the work more readily and with greater accuracy and uniformity.

These objects are accomplished by the provisions of a lathe tool which may be set to any desired radius and which is firmly held in such setting.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

One practical embodiment of the invention is illustrated in the accompanying drawing, wherein:

Fig. 1 is a plan view of an attachment constructed in accordance with the invention;

Fig. 2 is a similar view, partly in section;

Fig. 3 is a side elevation of a lathe with the attachment in place thereon.

Referring to the drawing by numerals of reference:

I provide a supporting plate 1 which may be attached by bolts to the tool block 3 of a lathe slide or carriage. Pivoted on the plate, as by means of screw 4, is a casing 5 in which is mounted for rectilinear sliding movement longitudinally of the casing a tool holder or shank 6, the rear end of which is tapped to receive screw 7 which projects through the rear end of the casing and is provided with a crank arm 8 through which the screw may be manually rotated to adjust the tool holder longitudinally of the casing. The play of the tool holder within the casing may be limited by a pin 9 which has its ends secured in the side walls of the casing and passes through a slot formed in the holder, as seen most clearly in Fig. 2.

The forward end of the tool holder is provided with oppositely disposed radially extending lugs 10 adapted to selectively engage cam surfaces 11 which may be secured by screws or otherwise to cylinders 12 formed at each end of a plate 13, which is secured to the rest.

In each cylinder 12 is mounted a plunger 14 urged inwardly by a coiled spring 15 and held in retracted position within the cylinder, when desired, by the cotter pin 16 which passes through a slot formed in the shank of the plunger and which may pass through a key hole slot 17 formed in the cylinder head when the plunger is rotated to proper position. A cutting tool 18 may be mounted in the forward end of the tool holder in any usual manner.

In practice a ring 19 is mounted in the lathe chuck 20 and the tool carriage 21 moved along the ways to desired position, which may be indicated by a stop (not shown) fastened on the ways. The cross slide is then moved to the desired position for the height of ring required, and is moved to the same position for each ring cut. One plunger 14 is released, depending upon whether the operation is right hand or left hand, so as to bear upon the side of the casing 5 and force lug 10 toward a cam surface 11. The tool holder is then moved to the desired position through screw 7 and crank arm 8 to bring the lug 10 to the proper position with respect to the cam surface to give the ring flange the desired thickness.

It will be understood that as the ring flange is cut away by the tool the plunger 14 forces the tool and casing to one side until the lug 10 engages the cam surface 11, at which position cutting of the ring ceases and the desired thickness is had.

I claim:

1. A lathe attachment, including a supporting plate, a casing pivoted to the plate, a tool holder slidable longitudinally within the casing, manually operable means for moving the tool holder to adjusted position within the casing, a lug on the tool holder, a cam surface connected to the plate and engageable by the lug for limiting the movement of the tool holder in one direction, resilient means tending to rock the casing on its pivot to force the lug against the cam surface and a cutting tool carried by the tool holder.

2. A lathe attachment, including a pivotally mounted casing, a tool holder slidable longitudinally in the casing, means for sliding the holder to adjusted position, a cam surface cooperating with the holder to limit movement of the casing about its pivot in one direction, means tending to rock the casing about its pivot and toward the cam and a cutting tool carried by the holder.

3. A lathe attachment, including a pivotally mounted casing a tool holder movable longitudinally within the casing, means for moving the holder to adjusted position within the casing, means for selectively rocking the casing upon its pivot in either direction, means for limiting the movement of the casing about its pivot and a cutting tool carried by the holder.

JOHN C. OLSEN.